United States Patent [19]

Umemoto et al.

[11] Patent Number: 4,528,872
[45] Date of Patent: Jul. 16, 1985

[54] CHANGE-SPEED APPARATUS IN A TRACTOR

[75] Inventors: Tomeo Umemoto, Sennan; Toshiyuki Yotsumoto, Kishiwada, both of Japan

[73] Assignee: Kubota, Ltd., Japan

[21] Appl. No.: 373,609

[22] Filed: Apr. 30, 1982

[30] Foreign Application Priority Data

Nov. 26, 1981 [JP] Japan .............................. 56-175917

[51] Int. Cl.³ ........................................... F16H 57/10
[52] U.S. Cl. ..................................... 74/781 R; 74/782
[58] Field of Search ...................... 74/781 R, 782, 783, 74/793, 794, 797, 801

[56] References Cited

U.S. PATENT DOCUMENTS

| 2,115,964 | 5/1938 | Osborne | 74/781 R |
|---|---|---|---|
| 2,578,308 | 12/1951 | Iavelli | 74/781 R |
| 2,918,832 | 12/1959 | Meyers | 74/785 |
| 3,487,726 | 1/1970 | Burnett | 74/781 R |
| 3,491,863 | 1/1970 | Karlsson et al. | 74/781 R |
| 4,282,775 | 8/1981 | Van Dest | 74/781 R |
| 4,387,607 | 6/1983 | Sakakibara | 74/781 R |

FOREIGN PATENT DOCUMENTS

| 613252 | 1/1961 | Canada | 74/781 R |
|---|---|---|---|
| WO81/02453 | 9/1981 | PCT Int'l Appl. | 74/781 R |

Primary Examiner—Allan D. Herrmann
Assistant Examiner—Arthur T. Quiray
Attorney, Agent, or Firm—Kane, Dalsimer, Kane, Sullivan and Kurucz

[57] ABSTRACT

A change-speed apparatus in a tractor equipped with an engine has a planetary gearing mechanism settable between its two positions. Actuation of the mechanism to one of the two positions is hydraulically power-actuated, while actuation to the other of the two positions is automatically effected, as the hydraulic power is released, by a resiliently urging spring. Power-transmitting operative connection is therefore always maintained between the engine and running-drive wheels even when the hydraulic actuation power comes to extinct.

1 Claim, 2 Drawing Figures

CHANGE-SPEED APPARATUS IN A TRACTOR

BACKGROUND OF THE INVENTION

(1) Field of the Invention

This invention relates to a change-speed apparatus in a tractor, provided with a planetary gearing mechanism to function as a two-step speed shifter.

(2) Description of the Prior Art

As has conventionally been the case, when a tractor is equipped with a change-speed apparatus provided in turn with a planetary gearing mechanism and with a hydraulically operated clutching assembly, wherein the planetary gearing mechanism has: a ring gear operatively connected to a driving shaft; a carrier, journaling thereon planetary gears in meshing with the ring gear, operatively connected to an output shaft; and a sun gear in meshing with the planetary gears, shiftable between an inactive transmission maneuvering position of being let to freely and idly rotate without bearing any transmission load and an active transmission maneuvering position of being consolidated with a stationary mass thus of being blocked against rotation as so hydraulically power-actuated with intermediary of the said clutching assembly which is supplied with the working oil pressurized by a pump driven by the engine power; there has been a problem, when the engine is stopped for instance during the parking, in that the said working oil pressure accordingly comes to extinction to therefore bring the clutching assembly into said inactive transmission maneuvering position thus ruining and incapacitating the function of the engine brake as would be expected if the engine piston as inversely driven from the wheels tending inadvertently to move should show effective resisting effort against such forcible inverse driving, since in the said conventional case of the inactive transmission the inverse driving by such wheels, tending to move for instance on a slant, can reach back indeed up to the output shaft of the clutching assembly but the output shaft, consolidated with the carrier, then rotates idly without effectively transmitting any power back to the ring gear and further to the engine as it only causes the idle sun gear to freely rotate.

SUMMARY OF THE INVENTION

This invention has as its main object to provide a change-speed apparatus in a tractor equipped with an engine, as may enhance the security in parking the tractor for instance on a slant.

In order to attain the object, the apparatus according to this invention comprises: a stationary casing provided with inner protruding portion; an input or driving shaft; an output shaft; a planetary gearing mechanism comprising: a ring gear supported on the driving shaft so as to be consolidated therewith with respect to rotation, a carrier journaling thereon at least a planetary gear as pivoted to rotate in meshing with the ring gear, the carrier in turn being supported on the output shaft so as to be consolidated therewith with respect to rotation, and a sun gear centrally rotatably supported to rotate in meshing with said at least one planetary gear; and a dual clutching assembly interposed in between the planetary gearing mechanism and the inner protruding portion of the stationary casing, the assembly being: settable either in a first maneuvering position, where the sun gear is thereby made to be consolidated with the carrier with respect to rotation, or in a second maneuvering position, where the sun gear is thereby made to be consolidated with the said inner protruding portion thus is blocked against rotation, more particularly, hydraulically power-shiftable to the first maneuvering position but always resiliently urged towards the second maneuvering position.

Thus, the dual clutching assembly provides a high change-speed state, when shifted to its first maneuvering position, of rotating the output shaft consolidatedly with the driving shaft, thus without speed reduction, and a low change-speed state, when shifted to its second maneuvering position, of rotating the output shaft with speed reduction with respect to the driving shaft, and since the dual clutching assembly is always resiliently urged towards the second maneuvering position, thus into the low change-speed state where the function of the engine brake is more effective than in the high change-speed state, the dual clutching assembly can securely maintain, even when the engine is stopped and the working oil is depressurized, the optimal effective interlocking state between the running-drive wheels and the engine, simply by being shifted to the second maneuvering position as described hereinabove; and it is hereby made possible to enhance the security in parking the tractor for instance even on a slant with the engine stopped and even when the operator has inadvertently left unpulled the parking brake of the tractor, which is called the hand brake or in Japan the side brake as well, or has insufficiently pulled same; with the dual clutching assembly shifted as described above to its second maneuvering position.

Other objects and advantages of this invention will become apparent from the detailed description to follow hereunder:

BRIEF DESCRIPTION OF THE DRAWINGS

The drawings show, by way of example, an embodiment of the change-speed apparatus in a tractor, according to this invention, wherein.

DESCRIPTION OF THE PREFERRED EMBODIMENT

Figure 1:
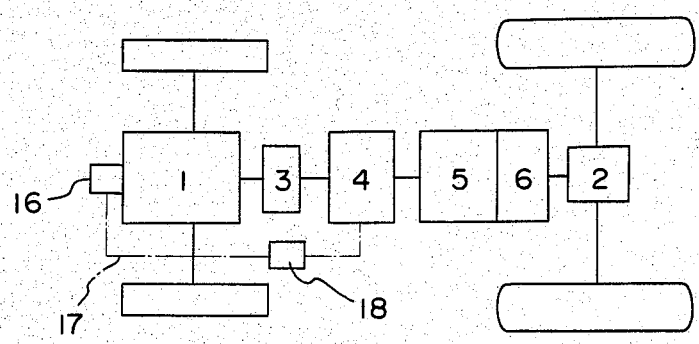
FIG. 1 is a block diagram of the power transmission system and FIG. 2 is an enlarged longitudinal sectional view of an essential portion of the apparatus, with some parts cut away.
Figure 2:
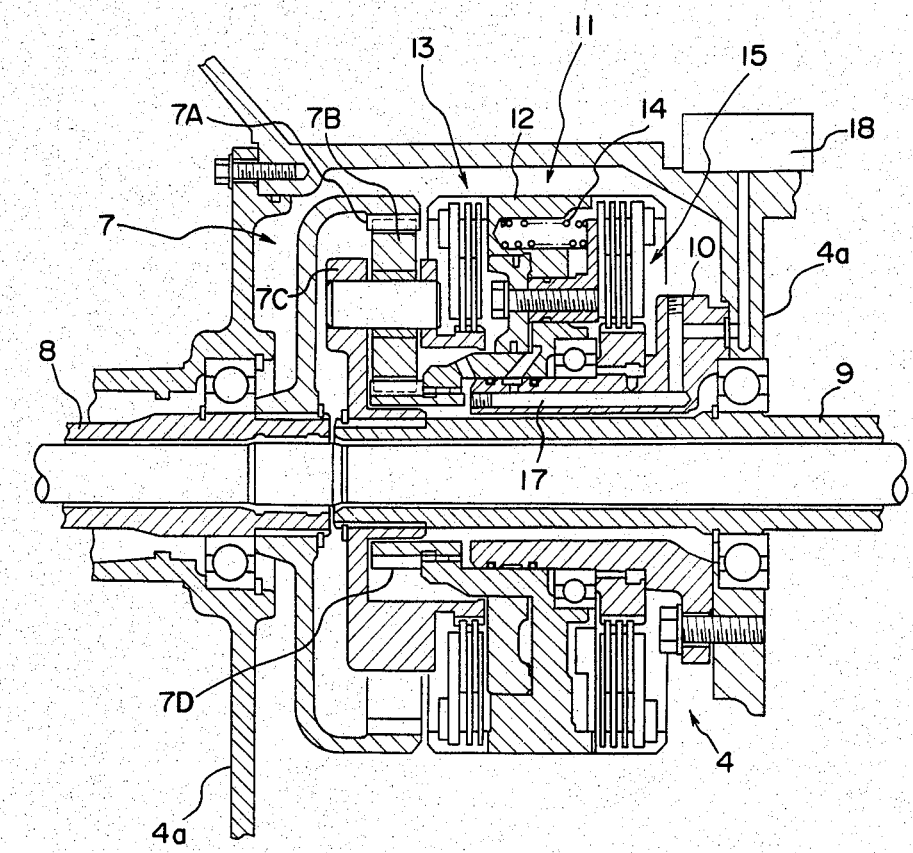

Describing in detail the specific embodiment illustrated in the drawings, a tractor has an engine (1) to drive a rearwheel differential (2) via the transmission line including a main clutch (3), as auxiliary change-speed apparatus or more specifically a two-step speed shifter (4), accommodated in a stationary casing (4a) provided with inner protruding portion (10), and a main change-speed apparatus which has a primary stage (5) and a secondary stage (6). The auxiliary speed shifter (4) utilizes a planetary gearing mechanism (7), and the specific construction of the shifter (4) is described in more detail as follows:

Thus, the auxiliary speed shifter (4) has: an input or driving shaft (8); an output shaft (9); the planetary gearing mechanism (7) having in turn, a ring gear (7A) supported on the driving shaft (8) so as to be consolidated therewith with respect to rotation, a carrier (7C) journaling thereon at least a planetary gear (7B) as pivoted to rotate in meshing with the ring gear (7A), the carrier (7C) being in turn supported on the output shaft (9) so as to be consolidated therewith with respect to rotation, and a sun gear (7D) centrally rotatably supported to rotate in meshing with said at least one planetary gear; and a dual clutching assembly (11) interposed in between the planetary gearing mechanism (7) and the inner protruding portion (10) of the stationary casing (4a), the assembly (11) being: settable either in a first maneuvering position, where the sun gear (7D) is thereby made to be consolidated with the carrier (7C) with respect to rotation, or in a second maneuvering position, where the sun gear (7D) is thereby made to be consolidated with the said inner protruding portion (10) thus is blocked against rotation, more particularly the assembly (11) being hydraulically power-shiftable to the first maneuvering position to provide higher-speed transmission, but always resiliently urged towards the second maneuvering position to provide lower-speed transmission.

Looking in further detail into the dual clutching assembly (11), it has: a clutch case (12) supported radially outwardly of the sun gear (7D) as to consolidatedly rotate therewith; a wet-type hydraulically operated first multiplate clutch (13) interposed in between the clutch case (12) and the said carrier (7C), in such a manner as is reversibly shiftable by hydraulic actuation thereof to a clutch-on position where the clutch case (12), thus also the sun gear (7D), is thereby made to be consolidated with the carrier (7C) with respect to rotation; a second multiplate clutch (15) interposed in between the clutch case (12) and the inner protruding portion (10) of the said stationary casing (4a), as is operatively interlocked with the first clutch (13) so as to be in the opposite actuation state as compared with that of the same and as is always resiliently urged by a spring (14) towards a clutch-on position where the clutch case (12), thus also the sun gear (7D), is thereby made to be consolidated with the said inner protruding portion (10) and is therefore blocked against rotation; and an on-off valve (18) interposed in a path (17) provided for supply to the first clutch (13) of the actuating hydraulic oil as pressurized by a pump (16) driven by the engine (1).

We claim:

1. A change-speed apparatus for a tractor comprising:
a planetary gearing mechanism (7) comprising a ring gear (7A), planetary gears (7B) carried by a carrier (7C), and a sun gear (7D);
an input or driving shaft (8) operatively interlocked with said ring gear (7A);
an output shaft (9) operatively interlocked with said carrier (7C);
an inner protruding portion (10) securely fixed to a stationary casing (4a) and radially surrounding said output shaft (9);
a clutch case (12) rotatable with said sun gear (7D) surrounding said inner protruding portion (10);
a wet-type hydraulically operated first multiplate clutch (13) interposed between said clutch case (12) and said carrier (7C) and shiftable to interlock said gun gear (7D) and said carrier (7C);
a second multiplate cluth (15) interposed between said clutch case (12) and said inner protruding portion (10) and shiftable to interlock said clutch case (12) and said stationary inner protruding portion (10);
a spring (14) disposed in said clutch case (12) for constantly transmitting an axial thrust to said second multiplate clutch (15);
a hydaulic pressure being applied to engage said first clutch (13) when a fluid under pressure is supplied through a fluid path (17) defined in said casing (4a), said inner protruding portion (10) and said clutch case (12), to thereby interlock said sun gear (7D) and said carrier (7C), and to engage said second clutch (15) by action of said spring (14) when said fluid is depressurized to thereby lock said sun gear (7D) against rotation by means of said inner protruding portion (10).

* * * * *